Figure 1:
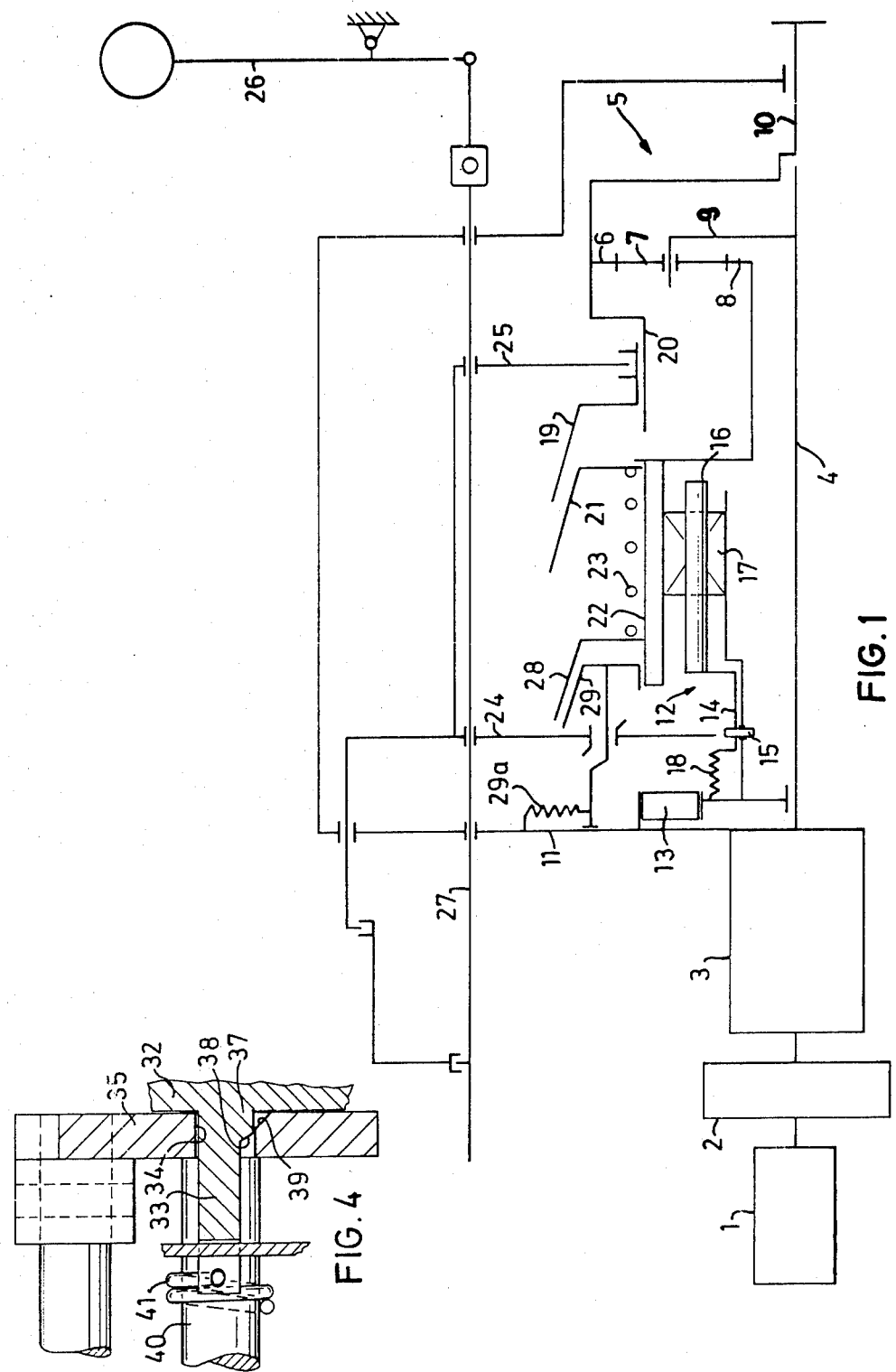

United States Patent [19]

Weiertz et al.

[11] 4,391,164
[45] Jul. 5, 1983

[54] OVERDRIVE FOR MOTOR VEHICLES

[75] Inventors: Stig H. A. Weiertz, Kungälv; Grzegorz K. Janiszewski, Angered, both of Sweden

[73] Assignee: AB Volvo, Gothenburg, Sweden

[21] Appl. No.: 204,082

[22] Filed: Nov. 4, 1980

[30] Foreign Application Priority Data

Nov. 22, 1979 [SE] Sweden ............................... 7909663

[51] Int. Cl.³ .......................................... F16H 57/10
[52] U.S. Cl. ................................................. 74/781 R
[58] Field of Search ..................... 74/781 R, 782, 783, 74/339

[56] References Cited

U.S. PATENT DOCUMENTS 3,477,313  11/1969  Ringe ................................. 74/781 R
4,043,223   8/1977  Ohnuma et al. ................. 74/781 R
4,098,148   7/1978  Wayman ........................... 74/781 R
4,114,478   9/1978  Clauss ............................... 74/781 R
4,189,960   2/1980  Holdeman ......................... 74/781 R Primary Examiner—George H. Krizmanich
Attorney, Agent, or Firm—Young & Thompson

[57] ABSTRACT

A planetary-type overdrive for motor vehicles in which, when engaged, the sun pinion is fixed relative to the housing by means of a completely disengageable one-way clutch when torque is transmitted from the input shaft to the output shaft. Free-wheeling is achieved when torque is transmitted in the opposite direction. A brake device is coupled between the one-way clutch part joined to the sun pinion and the overdrive housing. When shifting from direct drive to overdrive, the sun pinion is braked before the one-way clutch is engaged, i.e. before its blocking function is established.

7 Claims, 4 Drawing Figures

OVERDRIVE FOR MOTOR VEHICLES

The present invention relates to an overdrive for motor vehicles, comprising a planet carrier which is joined to an input shaft, a ring gear with internal teeth, which ring gear engages planet pinions carried on the planet carrier and is joined to an output shaft, a sun pinion engaging the planet pinions, a one-way brake coupled between the housing of the overdrive and the sun pinion, said one-way brake being arranged to lock the sun pinion to the housing when driving torque is transmitted from the input shaft to the output shaft, and a clutch which is disposed, when engaged, to establish non-rotatable connection between the sun pinion and the ring gear, the one-way brake being provided with control means which cooperate with operating means for the clutch, to suspend the braking function of the one-way brake before the clutch is engaged.

An overdrive of the above type is shown in U.S. Pat. No. 4,223,572 and has the advantage of being able to be engaged and disengaged mechanically with the aid of the shift lever of the main gearbox or by a simplified electrohydraulic system. This eliminates heavy, expensive and complicated electromagnetic or electrohydraulic systems which up to now have been usual and which have also reduced efficiency because of pump loss. An additional essential advantage of this overdrive is that the one-way clutch eliminates engine braking when the overdrive is engaged, while preserving engine braking in the other gears. With this overdrive transmission it is always possible to obtain a gentle downshifting from overdrive to direct drive. It is however difficult or practically impossible, because of the function of the one-way brake, to achieve smooth shifting from direct drive to overdrive, especially since the shifting is accomplished by a short lever movement without any marked neutral position. The one-way brake is thus engaged while the input and output shafts of the overdrive are still rotating at approximately the same speed, i.e. with the sun pinion in rotation. The result of the engagement is that the braking members of the one-way brake are suddenly brought into locking engagement and lock the sun pinion.

The purpose of the present invention is to further develop an overdrive of the type described in the introduction, so that smooth shifting can also be obtained when shifting from direct drive to overdrive.

This is achieved according to the invention by the sun pinion being coordinated with braking means which are arranged to brake the sun pinion after disengagement of the second clutch and prior to establishment of the braking function of the one-way brake.

Figure 2:
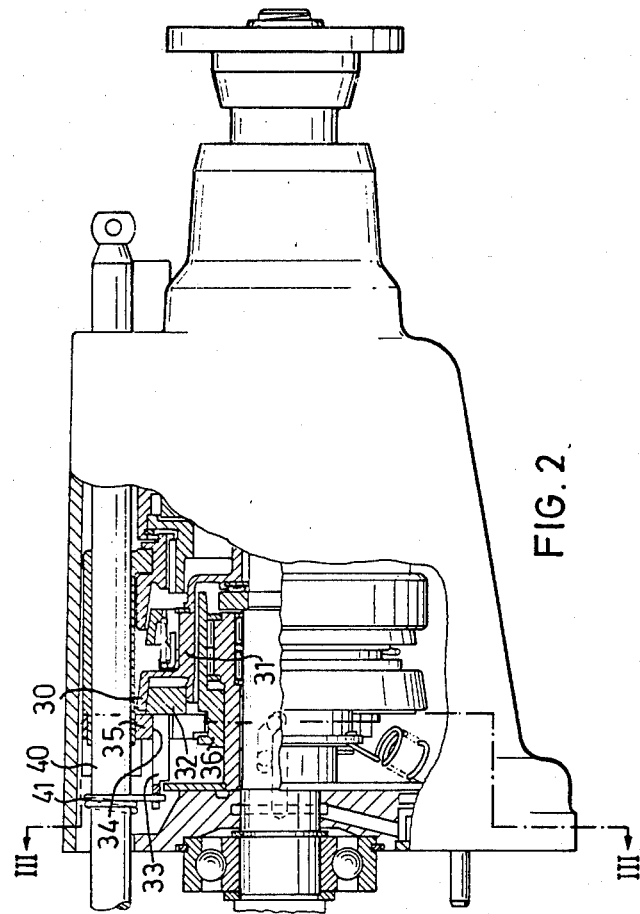
Figure 3:
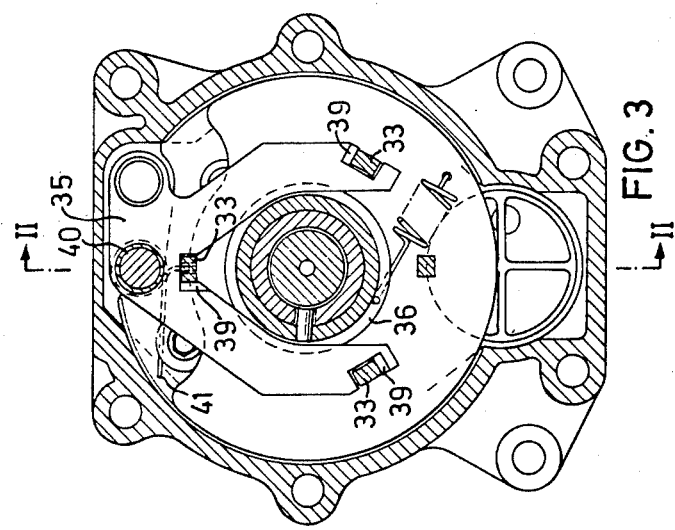

The invention will be described in more detail with reference to examples shown in the accompanying drawings, of which FIG. 1 shows schematically an overdrive according to the invention, FIG. 2 shows an embodiment, partially in longitudinal section, of the overdrive according to the invention, FIG. 3 shows a cross section along the line III—III in FIG. 2, and FIG. 4 shows a detailed view of a portion of the braking device.

In FIG. 1, 1 designates an engine, 2 a main clutch and 3 a main gearbox. A planetary transmission 5 is connected to the output shaft 4 of the gearbox 3 and has a ring gear 6, planet pinions 7 and a sun pinion 8. The planet carrier 9 of the planetary transmission 5 is joined to the output shaft 4 of the gearbox 3, while the ring gear 6 is joined to the output shaft 10 of the planetary transmission. A one-way brake 12 is coupled between the sun pinion 8 and the housing 11 of the planetary transmission, with a rubber absorber 13 coupled therebetween for absorbing torsional vibrations. The one-way brake 12 has a sleeve 14 which by sliding and simultaneous turning can disengage the sun pinion 8 for rotation in both directions. For this purpose the sleeve 14 has a radial pin 15 which engages in a diagonal groove in its hub to turn the sleeve when the sleeve is displaced axially, and a plurality of axial pins 16 which displace locking members of the one-way brake in the form of rollers 17 from the engagement position. The sleeve 14 is also spring-biased towards the engagement position by a spring 18.

A clutch is arranged between the ring gear 6 and the sun pinion 8, which clutch comprises a first clutch member 19 provided with a friction surface and slidable on a hub 20 joined to the ring gear 6, and a second clutch member 21 carried by a hub 22 which forms the outer ring of the one-way clutch and which is joined to the sun pinion 8 and the one-way brake 12. The second clutch member 21 is only limitedly slidable axially and is biased towards the first clutch member by a spring 23. The displacement of the clutch member 19 and the sleeve 14 is achieved with forks 24,25 which are coupled to the shift lever 26 of the gearbox 3 via a shift rod 27.

According to the invention the outer ring 22 of the one-way clutch also carries one part 28 of a friction brake. The outer part 29 of the brake is mounted in bearings in the transmission housing for axial displacement with the aid of the fork 24 and is biased in one rotational direction by a spring 29a, as will be described in more detail in connection with FIGS. 2 to 4.

FIG. 1 shows the clutch consisting of the clutch members 19,21 in disengaged position. The sleeve 14 is brought to a position in which the one-way brake 12 is operative, i.e. it permits rotation of the hub 22 and the connected sun pinion 8 in only one rotational direction. When driving from the output shaft 4 of the gearbox 3 the torque is transmitted to the planet carrier 9, the sun pinion 8 being locked against rotation in the rotational direction of the planet carrier by the one-way brake 12. The planet pinions 7 roll on the stationary sun pinion 8 and drive the ring gear 6 at a higher rotational speed than the rotational speed of the planet carrier 9. The overdrive is thus engaged.

When shifting from overdrive to direct drive, e.g. fourth gear, the main clutch 2 is first disengaged, whereafter the shift lever 26 of the gearbox 3 is moved into the fourth gear position. The braking function of the one-way brake 12 is thereby suspended by the sleeve 14 being displaced in the disengaging direction by the fork 24. At the same time the clutch member 19 is displaced against the clutch member 21 by the fork 25. The frictional surfaces of the clutch members 19,21 thereby make contact to synchronize the rotational speeds of the ring gear 6 and the sun pinion 8, this being done only after suspension of the braking function of the one-way brake. Smooth downshifting is achieved by virtue of the fact that the clutch members 19,21 serve as synchronizing means in this manner.

When shifting back to overdrive the sequence is reversed, with the exception that the brake 28,29 is employed. At the same time as the fork 25 moves the clutch member 19 to the right in FIG. 1 out of engagement with the clutch member 21, the fork 24 moves the brake member 29 towards the brake member 28. The movements of the forks 24,25 are adapted so that the clutch 19,21 is disengaged before the brake members 28,29 engage to bring the sun pinion 8 to a stop. Furthermore, the brake member 29 and the sleeve 14 of the one-way clutch are affected by the fork 24 in such a manner that the brake 28,29 starts to function prior to the establishment of the braking function of the one-way brake. Thus the brake serves as a synchronizing device providing smooth engagement of the overdrive.

FIGS. 2 and 3 show an embodiment of an overdrive transmission according to the invention which has the same principle construction and function as the described above, and therefore only parts connected with the brake device will be described in detail here. Further information is given in the previously mentioned U.S. patent.

The brake device comprises a brake cone 30 which is made in one piece with the outer ring 31 of the one-way clutch, and a brake cone 32 which is axially movable into and out of engagement with the brake cone 30. The cone 32 is made with axially directed pins 33 which extend through associated cavities 34 in a shift fork 35 which in turn engages in a peripheral groove in the clutch sleeve 36 of the one-way clutch. As can be seen in FIG. 4, the pins 33 are made with a shoulder 37 which has a bevelled abutment surface 38 facing the fork 35. The cavities 34 of the fork have a bevelled edge which forms an abutment surface 39 facing the abutment surface 38. The uppermost pin 33 engages a helical spring 41 laid around the shift rod 40, said spring biasing the pin in the direction towards the abutment surface 39 of the cavity 34.

In the position of the fork 35 shown in FIGS. 2 to 4, the overdrive is engaged. When direct drive is engaged, the fork is moved to the left from the position shown, so that the abutment surfaces 39 of the cavities 34 are located to the left of the abutment surfaces 38 of the pins 33, and the cone 32 is turned by the spring 41 to a position in which the abutment surfaces are face to face. Thus, when shifting into overdrive the brake cone 32 will be pressed, by the interaction of the abutment surfaces 38,39 against the brake cone 30. When the cone 30, and thereby the sun pinion, have been brought to a halt, the bevelling of the abutment surfaces will cause the brake cone 32 to be turned a small amount so that the shoulders 37 of the pins 33 can pass into the cavities 34, and the fork 35 can be moved to the position shown in the figures. It is only in this last part of the shifting path of the fork 35 that the blocking function of the one-way clutch is established by turning the sleeve 36 in the manner described previously. Thus, the one-way clutch is first engaged after the braking of the sun pinion, resulting in smooth shifting.

What we claim is:

1. In an overdrive for motor vehicles, comprising a housing for the overdrive, a planet carrier which is joined to an input shaft, a ring gear with internal teeth, which ring gear engages planet pinions carried on the planet carrier and is joined to an output shaft, a sun pinion engaging the planet pinions, a one-way brake coupled between the housing of the overdrive and the sun pinion, said one-way brake being arranged to lock the sun pinion to the housing when driving torque is transmitted from the input shaft to the output shaft, and a clutch which is disposed, when engaged, to establish non-rotatable connection between the sun pinion and the ring gear, and means to suspend the braking function of the one-way brake before the clutch is engaged; the improvement comprising brake means that brake the sun pinion after disengagement of the clutch and prior to the establishment of the braking function of the one-way brake.

2. An overdrive according to claim 1, characterized in that said brake means comprise first and second friction members which are movable into and out of frictional engagement with each other, that the first friction member is non-rotatably connected to the sun pinion for rotation together with the same, and that the section friction member is connected to means which act to prevent rotation of the second friction member.

3. An overdrive according to claim 2, characterized in that the first friction member is rigidly joined to the one-way brake part joined to the sun pinion, and that the second friction member is axially displaceable under the influence of means which are connected to said means to suspend the braking function of the one-way brake.

4. An overdrive according to claim 3, characterized in that said means for axial displacement of the second friction member consist of a shift fork which is connected to a shift rod axially displaceable in the overdrive housing and engages actuating means for the one-way brake in the form of an axially displaceable and rotatably mounted sleeve.

5. An overdrive according to claim 4, characterized in that the second friction member and the shift fork have abutment surfaces which, as the shift fork moves a first distance in one direction to establish the braking function of the one-way clutch, cooperate with each other to move the second friction member into engagement with the first friction member, the abutment surfaces being bevelled in order to achieve, after the shift fork has moved said first distance, turning of the second friction member relative to the shift fork and to bring the abutment surfaces out of engagement with each other, whereafter the shift fork is movable relative to the friction member to establish the braking function of the one-way clutch.

6. An overdrive according to claim 5, characterized in that the second friction member has axially directed pins which extend through cavities in the shift fork, each cavity having a bevelled edge surface which forms one abutment surface, and each pin has a shoulder, facing said edge surface, with a bevelled edge surface which forms the second abutment surface.

7. An overdrive according to claim 6, characterized in that spring means are arranged which act to hold the abutment surfaces in engagement with each other.

* * * * *